(12) United States Patent
Bigioi et al.

(10) Patent No.: US 7,506,057 B2
(45) Date of Patent: Mar. 17, 2009

(54) METHOD FOR ESTABLISHING A PAIRED CONNECTION BETWEEN MEDIA DEVICES

(75) Inventors: Petronel Bigioi, Galway (IE); Peter Corooran, Galway (IE); Eran Steinberg, San Francisco, CA (US)

(73) Assignee: FotoNation Vision Limited, Galway (IE)

( * ) Notice: Subject to any disclaimer, the term of this patent is extended or adjusted under 35 U.S.C. 154(b) by 823 days.

(21) Appl. No.: 11/156,234

(22) Filed: Jun. 17, 2005

(65) Prior Publication Data

US 2006/0285502 A1 Dec. 21, 2006

(51) Int. Cl.
*G06F 15/16* (2006.01)
(52) U.S. Cl. .................. 709/227; 709/202; 709/228
(58) Field of Classification Search ......... 709/202–203, 709/219, 227–229
See application file for complete search history.

(56) References Cited

U.S. PATENT DOCUMENTS

| | | | |
|---|---|---|---|
| 5,500,700 A | | 3/1996 | Massarsky |
| 5,555,376 A | * | 9/1996 | Theimer et al. .......... 709/229 |
| 5,602,997 A | | 2/1997 | Carpenter et al. |
| 5,727,135 A | | 3/1998 | Webb et al. |
| 5,812,865 A | * | 9/1998 | Theimer et al. .......... 709/228 |
| 5,886,732 A | | 3/1999 | Humpleman |
| 6,182,094 B1 | | 1/2001 | Humpleman et al. |
| 6,184,998 B1 | | 2/2001 | Tebeka |
| 6,211,870 B1 | | 4/2001 | Foster |
| 6,275,144 B1 | | 8/2001 | Rumbaugh |
| 6,591,069 B2 | | 7/2003 | Horiguchi |
| 6,697,090 B1 | | 2/2004 | Nagasaka et al. |
| 6,725,281 B1 | | 4/2004 | Zintel et al. |
| 6,779,004 B1 | * | 8/2004 | Zintel ..................... 709/227 |
| 6,810,409 B1 | | 10/2004 | Fry et al. |
| 7,039,727 B2 | | 5/2006 | Camara et al. |
| 2002/0038372 A1 | * | 3/2002 | Idehara et al. .............. 709/227 |
| 2002/0043557 A1 | | 4/2002 | Tetsuya et al. |
| 2002/0120944 A1 | | 8/2002 | Wasilewski |
| 2003/0163542 A1 | | 8/2003 | Bulthuis et al. |
| 2004/0155791 A1 | | 8/2004 | Nguyen et al. |
| 2006/0048194 A1 | | 3/2006 | Poslinski |

(Continued)

FOREIGN PATENT DOCUMENTS

EP 1039772 A1 9/2000

(Continued)

OTHER PUBLICATIONS

PCT Invitation to Pay Additional Fees for PCT Application No. PCT/EP2006/003999, dated Oct. 10, 2006, 5 pages.

(Continued)

*Primary Examiner*—Bharat N Barot
(74) *Attorney, Agent, or Firm*—Andrew V. Smith (57) ABSTRACT

A method for establishing a paired connection between first and second media devices across a network includes transmitting a first information message across the network including an identifier that includes a request to pair the first and second media devices. When a second information message is received from the second media device within a first predetermined time period, the first device retrieves an identifier of the second device and transmits a confirmation message across the network including the device identifiers. A paired connection between the media devices is completed after a corresponding confirmation message from the second device is received within a second predetermined time period.

40 Claims, 7 Drawing Sheets

U.S. PATENT DOCUMENTS

| | | | |
|---|---|---|---|
| 2006/0149811 A1* | 7/2006 | Bennett et al. | 709/203 |
| 2006/0282551 A1 | 12/2006 | Steinberg et al. | |
| 2006/0282572 A1 | 12/2006 | Steinberg et al. | |
| 2006/0284982 A1 | 12/2006 | Bigioi et al. | |
| 2006/0288071 A1 | 12/2006 | Bigioi et al. | |
| 2008/0250239 A1* | 10/2008 | Risan et al. | 709/219 |

FOREIGN PATENT DOCUMENTS

| | | |
|---|---|---|
| WO | 0135664 A2 | 5/2001 |
| WO | 2006133764 A3 | 12/2006 |
| WO | WO 2006/133764 A2 | 12/2006 |
| WO | 2008150285 A3 | 12/2008 |

OTHER PUBLICATIONS

Notification of Transmittal of the International Search Report and the Written Opinion of the International Searching Authority, or the Declaration for PCT Application No. PCT/EP2006/003999, dated Jan. 30, 2007, 19 pages.

Bigioi P. et al., "PTP/IP—a new transport specification for wireless photography" IEEE Transactions on Consumer Electronics, vol. 51, Feb. 2005, XP002390454.

FotoNation, Inc. Report: "PTP over IP the state of the development" Internet, Sep. 2004, XP002390455, Retrieved from the Internet: URL:http://www.i3a.org/pdf/PTPIP_Technical_Overview_Oct2004.pdf.>.

Nikon Report: "Das Nikon Neuigkeiten-Archiv" News-Archiv, Feb. 2005 XP002390456 Internet.

Corcoran, P.M., et al., "Internet enabled digital photography" IEEE Transactions on Consumer Electronics, vol. 45, Aug. 3, 1999, pp. 577-583, XP002415217.

Corcoran, P.M., et al., "Wireless transfer of images from a digital camera to the Internet via a standard GSM mobile phone" IEEE Transactions on Consumer Electronics, vol. 47, Aug. 3, 2001, pp. 542-547, XP002415218.

White Paper of CIPA DC-005-2005, "'Picture Transfer Protocol' over TCP/IP networks", Standard of the Camera & Imaging Products Association, published by Camera & Imaging Products Association, Nov. 8, 2005, 6 pages.

Examination Report for European Patent Application No. 06742746.8, dated Mar. 6, 2008, 5 pages.

International Preliminary Report on Patentability for PCT Application No. PCT/EP2006/003999, dated Dec. 17, 2007, 13 pages.

\* cited by examiner

| Field | Size [Bytes] | Data Type |
|---|---|---|
| Protocol GUID | 16 | UINT8 |
| Packet Type | 2 | UINT16 |
| Payload | ? | ? |

Figure 5

| Field | Size [Bytes] | Data Type |
|---|---|---|
| Protocol GUID | 16 | UINT8 |
| Packet Type | 2 | UINT16 |
| Device GUID | 16 | UINT8 |
| Device Friendly Name | 2..80 | UINT16 |
| Reserved Data | 0 or more | UINT8 |

Figure 6

| Field | Size [Bytes] | Data Type |
|---|---|---|
| Protocol GUID | 16 | UINT8 |
| Packet Type | 2 | UINT16 |
| Own Device GUID | 16 | UINT8 |
| Received Device GUID | 16 | UINT8 |

METHOD FOR ESTABLISHING A PAIRED CONNECTION BETWEEN MEDIA DEVICES

RELATED APPLICATION

This application is related to a contemporaneously filed application entitled, "Server Device, User Interface Appliance, and Media Processing Network," by inventors Petronel Bigioi, Peter Corcoran, and Eran Steinberg, which is hereby incorporated by reference.

FIELD OF THE INVENTION

The invention relates to the field of networked appliances, particularly to networked digital cameras and support appliances for analysis, management, post-processing, sorting, storage and printing of digital images, metadata and audio data associated with said images.

BACKGROUND

Recently, communication protocols have developed for allowing a computing device to control and communicate with media devices such as digital cameras. One such protocol, ISO 157540 Picture Transfer Protocol (PTP), incorporated into products of the Microsoft Corporation of Redmond, Wash., can be used in connection with transferring images from imaging devices, such as cameras, to personal computing devices. This protocol defines how the digital still camera can communicate with a personal computing device.

Figure 1:
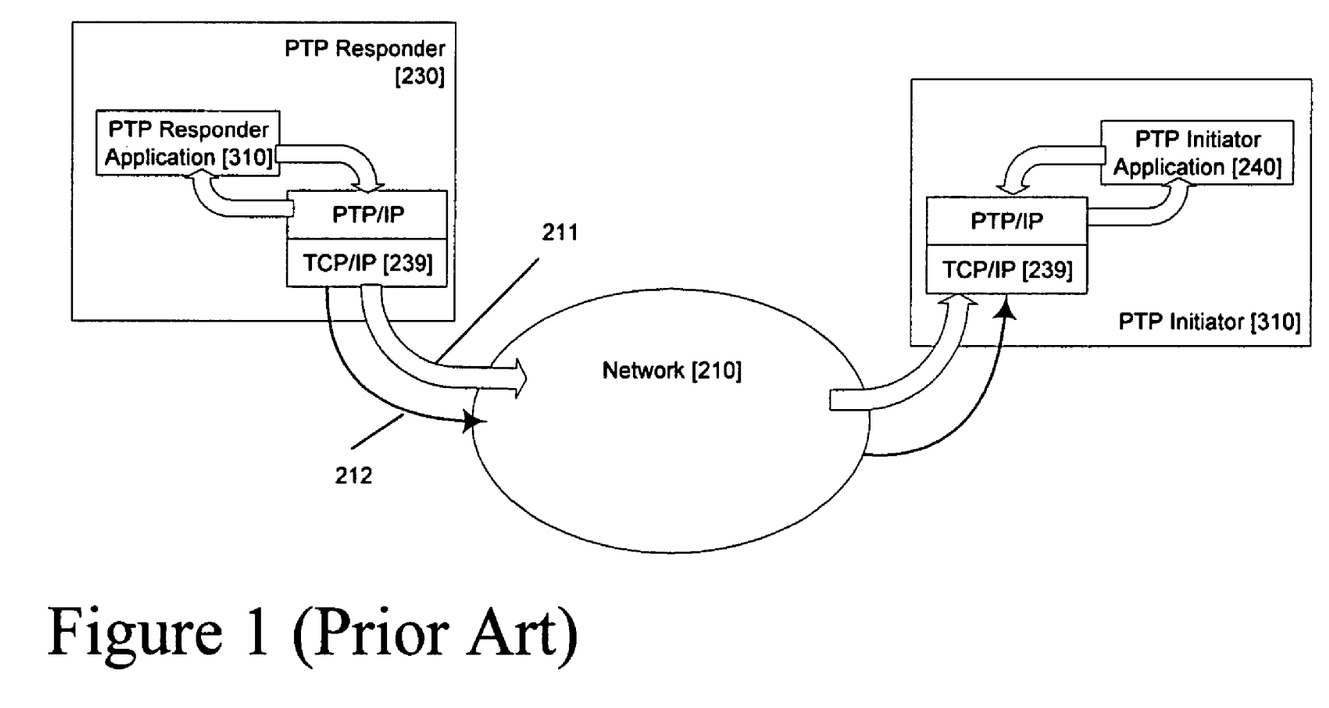
FIG. 1 illustrates operation of a conventional PTP/IP communication.

Referring to FIG. 1, the PTP protocol is an asymmetric control and data transfer protocol, somewhat like a master/slave protocol. However, in PTP parlance one refers to the devices engaged in a picture transfer as the Initiator 310 and Responder 230, rather than the Master and Slave. The Initiator 310 device establishes and subsequently manages a control connection while the Responder is defined as the device that responds to operation requests such as an "OpenSession" request.

Devices, in the PTP protocol model, can be Initiators, Responders, or both. For instance, a PC may be configured only as an Initiator device while a USB camera may be only a Responder. Similarly, a wireless camera, that opens a connection to a wireless PTP printer and pushes pictures for print, may be only an Initiator while the corresponding printer may be only a Responder. It is recognized by the inventors of the present invention that a digital camera that can connect to other digital cameras and is able to both initiate and receive a PTP session will have to be capable of behaving both as Initiator and Responder.

Usually, the Initiator will have a form of graphical user interface application 240 so that a user can see/browse thumbnails, select and chose an appropriate control action, and so on. The Initiator device implements the device enumeration and transport mapping (in the case that multiple, PTP-compliant transports are supported) in a transport specific manner. Typically, a Responder will not have a graphical user interface or multiple transport support.

In order for two PTP devices to exchange information about pictures or metadata, a PTP session may be established. A session is a logical connection between PTP devices, over which object identifiers, or ObjectHandles, and storage media identifiers, or StorageIDs, are persistent. A session is considered open after the Responder returns a valid response to an OpenSession operation requested by the Initiator. A session is closed after a CloseSession operation is completed or the transport closes the communication channel, whichever occurs first.

The only operation or data traffic allowed outside the session is a GetDeviceInfo operation and a DeviceInfo dataset. A device can issue/accept a GetDeviceInfo operation outside a session. A session may be utilized to transfer descriptors (e.g., StorageInfo, ObjectInfo), images or other objects between devices. Any data communicated between devices is considered valid unless a specific event occurs specifying otherwise.

PTP is actually a transport independent protocol. In its original embodiment it was designed and intended for use over a Universal Serial Bus (USB) transport—"legacy PTP". Alternative transports can be implemented over local area networks. Examples include PTP over Bluetooth and PTP over IP networks 210 (PTP/IP) as illustrated in FIG. 1.

As described in the PTP/IP Draft Specification which can be found at http://www.fotonation.com, hereby incorporated by reference, a PTP/IP device is uniquely recognized using a unique device identifier called GUID. Two PTP/IP devices can communicate with each other if their GUIDs are known to each other. In this way, application software running on such devices can implement restriction connection policies. Both the Initiator and Responder can maintain a list of GUIDs for devices to which they may connect.

There are multiple ways that the GUIDs of peer devices can be exchanged, e.g., storage media based methods or networking based methods.

Referring to FIG. 1, In PTP/IP, communication between two image devices happens via two TCP connections (logical data channels) 211, 212. The first connection 211 is dedicated to Operation Request, Response and Data transaction packets as well as to carry PTP/IP specific packets (i.e. Command/Data Connection). The second TCP connection 212 should be used exclusively for Event transaction packets (i.e., Event Connection). Event packets are transported separately from Operation and Data transaction packets because of their asynchronous nature.

Each of the Command/Data TCP and the Event connection are established by the image Initiator device and identified by the local and remote IP addresses and port numbers. The Responder's IP address and port number are provided through the device discovery mechanism or manually configured using a user interface on the Initiator device.

Further details are given in (i) "Digital camera connectivity solutions using the picture transfer protocol (PTP)" to Bigioi, P.; Susanu, G.; Corcoran, P.; Mocanu, I and published in IEEE Transactions on Consumer Electronics, volume 48, issue 3, p 417-427, August 2002; and (ii) PTP/ISO-15740 PTP Specification (see http://www.i3a.org/downloads it10.html), which are hereby incorporated by reference. Note that reference (i) above also includes a detailed description of a PTP/Bluetooth transport.

The PictBridge Standard (CIPA DC-001) from the Camera & Imaging Products Association (CIPA), and published in early 2003, provides for direct connection between image input devices, such as digital cameras, and image output devices, such as printers. It achieves this by standardizing the applications services for these devices. In particular it focuses on the provision of direct print services from a camera to a printer, without the need for a USB master device such as a desktop PC.

CIPA DC-001 advantage of the commonality of digital camera interfaces and data storage formats to provide an effective solution for connectivity between a single camera and a single printer. Key services offered by DC-001 compliant devices include: (i) direct printing one or more selected images on the camera UI; (ii) support for "Direct Print Ordering Format" (DPOF) based print services; (iii) index print of all images in camera; (iv) display of printer status information on the camera UI; (v) print job control functions—cancel, pause, restart and (vi) additional features which require advanced print setup, such as multiple print copies, image crop prior to print, specify image print size, etc.

CIPA DC-001 uses PTP to provide low-level functions and services which are used to support the higher-level functionality of PictBridge.

Most digital photography devices on the market today support legacy PTP in order to allow interconnection of media devices such as cameras and printers without the need for an intermediate desktop PC. Printers which are designed for digital photography will also support PictBridge which allows a PTP camera to directly select and print images. The physical link for such PTP enabled devices is usually a wired connection between the PTP/Pictbridge devices and this is typically a USB connection.

Wireless printers are already available in the market and next-generation cameras and printers will support connection over wireless networks using PTP/IP. This will provide users with a greatly enhanced experience creating photographic prints without physically connecting a camera to a printer.

Unfortunately the owners of legacy PTP devices will be unable to benefit because legacy cameras and printers do not (i) provide a physical network connection, (ii) their legacy PTP software does not support or understand TCP/IP networking and/or (iii) no support is provided in the PTP protocol for device discovery, nor for supporting the presence of multiple devices as would typically exist on a TCP/IP network.

SUMMARY OF THE INVENTION

A method is provided for establishing a paired connection between first and second media devices across a network. Responsive to user interaction with the first media device, a first information message including an identifier is transmitted across the network with a request to pair the first media device with the second media device. An identifier of the second device is retrieved from the second information message in response to receipt of the second information message from the second device within a first predetermined time period. A confirmation message including an identifier of the first device and an identifier of the second device is transmitted across the network. In response to receipt of a corresponding confirmation message from the second device within a second predetermined time period, a paired connection is completed. The connection employs a communications protocol which permits the first device to control the second device in providing a media acquisition, filtering and/or output service.

One or more of the information and confirmation messages may be transmitted via User Datagram Protocol.

The first media device may be responsive to receipt of an information message from a third media device, different from said second media device, upon failing to establish a paired connection with the second device during the first or second predetermined time periods.

Further paired connections may be established with further media devices.

The information and confirmation messages may include a protocol identifier.

The communicating may be according to the Picture Transfer Protocol (PTP).

A media device is also provided for handling media and establishing a paired connection with a second media device across a network. The media device includes a media device housing containing a media handling component architecture, a network interface coupled with the component architecture, and a pairing actuator.

The pairing actuator is signal-coupled with the network interface such that, upon user interaction with the pairing actuator, transmission of an information message is initiated through the network interface. The information message includes an identifier and a request to pair the media device with a second media device.

Responsive to receipt of an information message through the network interface from the second media device within a first predetermined time period, the first media device retrieves an identifier of the second device from the information message and transmits a confirmation message through the network interface including identifiers of the first and second devices. Responsive to receipt of a corresponding confirmation message through the network interface from the second media device within a second predetermined time period, a paired connection is completed. The connection employs a communications protocol which permits the first device to control the second device in providing a media acquisition, filtering and/or output service.

BRIEF DESCRIPTION OF THE DRAWINGS

Preferred and alternative embodiments will now be described by way of example, with reference to the accompanying drawings, in which:

FIGS. 7(*a*) to 7(*c*) illustrate PTP adapters coupled between various combinations of media devices.

DETAILED DESCRIPTION OF PREFERRED EMBODIMENTS

In preferred embodiments, a manual means of GUID exchange in order to allow further PTP/IP communication, also known as "device pairing", is provided. This exchange mechanism is particularly suited to usage scenarios for digital cameras and associated network printers. However, as may understood by those skilled in the art, alternative forms of exchange mechanisms may be used to support alternative embodiments.

Two particular device embodiments permit (i) a legacy PTP camera to be connected to a PTP/IP enabled PictBridge printer and (ii) a legacy PictBridge printer to allow connections to be created with PTP/IP enabled digital cameras.

As such, a device in accordance with a preferred embodiment provides TCP/IP network compatibility for legacy media devices such as PTP cameras and PictBridge printers. Advantageously, PictBridge functionality may be extended to a TCP/IP network by replacing the PTP/USB transport with PTP/IP, even when devices do not support a common physical TCP/IP network link.

Figure 2:
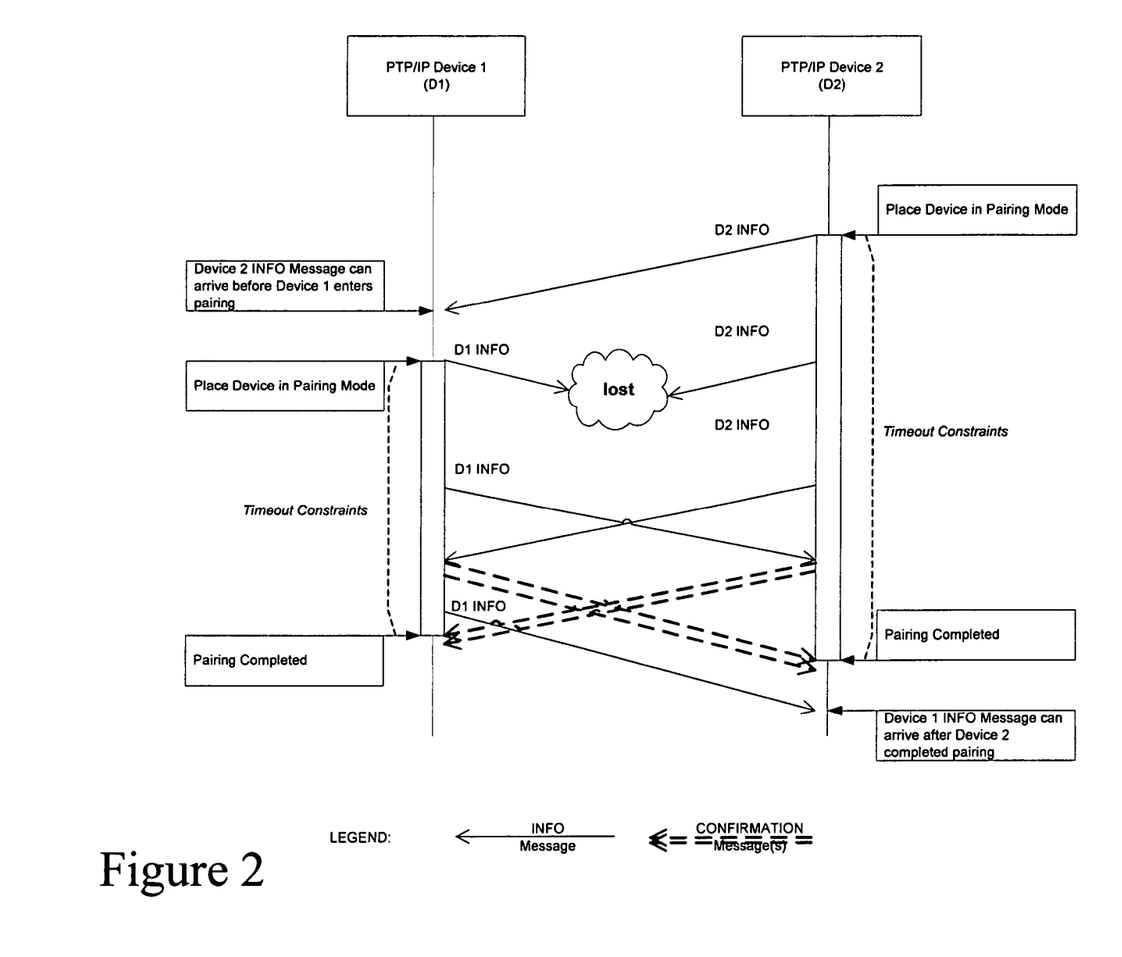
FIG. 2 illustrates a sequence of pairing two media devices according to a preferred embodiment.
Figure 4:
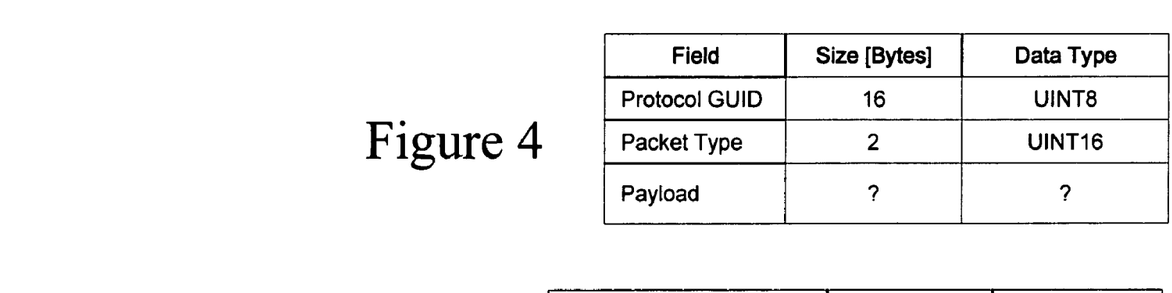
FIG. 4 illustrates a general format of a packet used in the pairing sequence of FIG. 2.

Referring now to FIG. 2, devices D1 and D2 are preferably paired before PTP/IP communication across a network takes place. In accordance with a preferred embodiment, a protocol based on an exchange of messages contains pairing information (GUID and Friendly Name) between two devices placed in a pairing mode (or pairing state). In general, messages employed by the protocol are preferably as shown in FIG. 4. Each packet part of this protocol starts with a 16 byte field representing a GUID of the protocol—a value specially generated for this protocol. The GUID used by the PTP/IP pairing mechanism of the preferred embodiment is 0FDB8EFB-6968-4734-A0CF-48694382A3D7. This GUID is basically a protocol identifier for ensuring that the received UDP packets will not be wrongfully interpreted.

The protocol GUID field is followed by a type field having one of the following values (two byte field):
0x01—DEVICE INFO
0x02—CONFIRMATION This in turn is followed by a payload which comprises a variable size content, differing according to the type of the packet.

Binary values in the packets are represented in the little endian format.

Preferably, a user causes a device to enter pairing mode by interaction with a suitable actuator. In a general purpose computing device running an application which communicates using PTP/IP, such actuation can include pressing a keyboard key or actuating a pointer switch. On less complex or more dedicated devices described later, however, actuation can be through a simple button. For simplicity, however, we will refer to these generally as the pairing actuator.

Preferably, the protocol is such that the chances that the pairing will be done successfully are larger if the pairing actuator on both devices which are to be connected is pressed at or about the same time.

In the preferred embodiment, when placed in pairing mode, the PTP/IP device sends out a series of DEVICE INFO messages and starts listening on UDP port 15740 for any Device INFO messages from remote devices.

When in pairing mode, the device sends one DEVICE INFO Message per second and the expiry time of pairing mode is set to 5 seconds.

Figure 5:
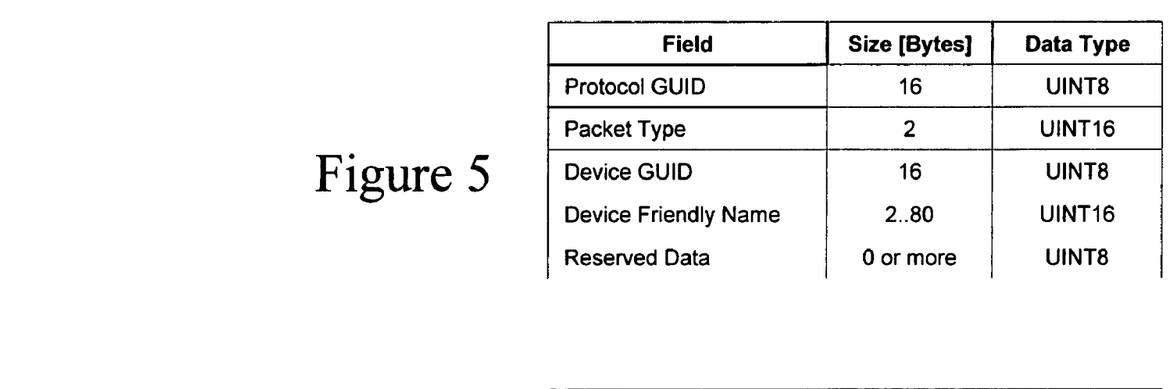
FIG. 5 illustrates a DEVICE INFO Message format.

FIG. 5 presents a preferred layout for a DEVICE INFO Packet:
Device GUID—is a device identifier (GUID)
Device Friendly Name—null-terminated UNICODE string that contains a human readable name for the remote device. The information in this field is generally used for application user interface purposes.
Reserved Data—0 or more bytes reserved for the expansion of the protocol.
The maximum value is limited by the MTU (Maximum Transmission Unit) of the used underlying network. This can be used for manufacturer specific data of the sending device.

The DEVICE INFO message is sent multiple times, with a time interval between them, to compensate for the fact that the two devices involved in the pairing procedure need not be put in pairing mode at exactly the same moment in time. Preferably, DEVICE INFO messages are sent at the above interval until a CONFIRMATION message is received or until the expiry time.

Figure 6:
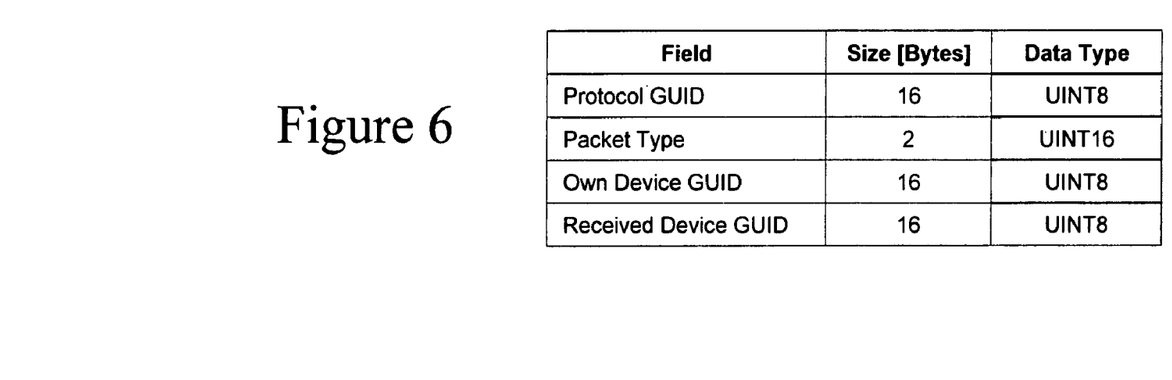
FIG. 6 illustrates a CONFIRMATION Message format.

Once a peer device receives a DEVICE INFO message, it will cache it and send out CONFIRMATION messages. Each CONFIRMATION message contains the information about both the originating and confirming device (GUIDs). To maximize the chances that the CONFIRMATION message will not be lost, it is preferred that a device send out three such messages at a time interval of 100 ms. Again CONFIRMATION messages are preferably uni-cast on port 15740 UDP. More specifically, they may have the format presented in FIG. 6, where:
Own Device GUID—is a device identifier (GUID)
Received Device GUID—is a device identifier (GUID) received via a DEVICE INFO message from the peer device.

Preferably, if a device involved in pairing receives DEVICE INFO messages from multiple devices when in pairing mode, it may fail the pairing procedure. Thus, the device preferably receives DEVICE INFO messages from only one peer device when in pairing mode to complete a successful pairing procedure. This is a practical limitation and it is based on an assumption that a user would usually wish to pair only two devices. Thus, receipt of more than one DEVICE INFO message would be indicative of an erroneous, insecure or undesirable operating environment. Likewise, a device should receive a CONFIRMATION message from no more than one peer device when in pairing mode for the same reason.

Figure 3:
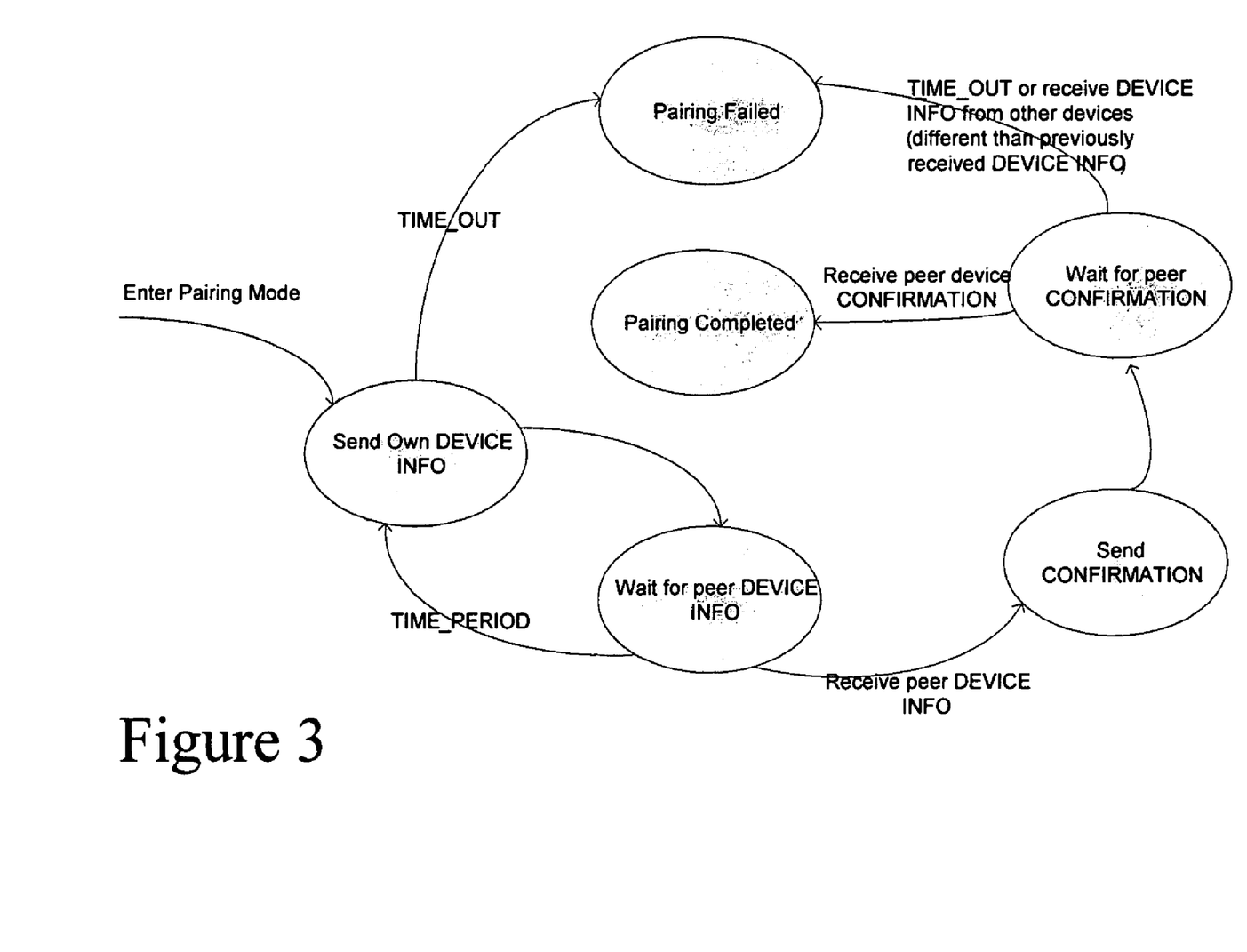
FIG. 3 illustrates a state diagram for the pairing sequence of FIG. 2.

The states that a PTP/IP device has to traverse in order to achieve a successful pairing are presented in FIG. 3.

As explained above, a device on entering pairing mode sends its own DEVICE INFO message and then waits for DEVICE INFO messages from peer pairing devices. Upon a defined time period (TIME_PERIOD), the device resends its own DEVICE INFO information. If upon a defined time out (TIME_OUT) period no peer DEVICE INFO is received, the device gives up and declares the pairing procedure failed.

If the device receives DEVICE INFO message from a peer device, then it sends its own CONFIRMATION message and waits for a peer CONFIRMATION message. Upon receipt of the peer device CONFIRMATION message matching the previous information received via peer DEVICE INFO message, the pairing session is completed successfully. If a CONFIRMATION message is not received upon the defined timeout (TIME_OUT) the pairing procedure is declared failed. If other DEVICE INFO messages are received from other devices than the one received initially, then the pairing procedure is declared failed. If other CONFIRMATION messages from other devices than the one received initially are received, then the pairing procedure is declared failed.

Nonetheless, it will be seen that once pairing has been completed between, e.g., a local device and a remote device, then in certain cases it can be possible to have the local device pair with one or more subsequent devices and to maintain connections to multiple remote devices in separate virtual sessions.

The features described herein in accordance with preferred and alternative embodiments find utility in many different types of devices where application software communicating through PTP/IP runs. These include, for example, general purpose computing devices, printers and digital image acquisition devices, e.g., digital cameras. These features can also be implemented in more dedicated devices such as hardware translators or indeed in software translators.

As explained above, there are two PTP transports already used in devices:
1) USB—which was the first adopted PTP transport and is currently widely supported in Digital Still Cameras and recently in PictBridge printers; and
2) PTP/IP—which is a relatively new transport and which will become available soon in some WiFi cameras.

Having adopted those transports, users will encounter the situation when it is desirable to have a "legacy" USB-PTP device communicate with a PTP/IP device.

In a particular embodiment, a translator may be used when it is either not possible or inconvenient to directly connect an Initiator to a Responder, e.g., because they are using different transports, i.e., hardware interfaces. An example would be where a USB Camera (PTP Responder) is to be connected to a PC (PTP Initiator) via WiFi.

In the context of the present specification, a PTP Translator is a device or a software module that indirectly connects a PTP Initiator with a PTP Responder, where Initiator and Responder usually (but not necessarily) use a different type of transport (e.g. USB, TCP/IP, etc.). The function of the translator is to repeat the PTP communication from one transport to another, as it would be if the Initiator and Responder were connected directly. A feature of such translators is that they don't fully implement PTP or application level protocols (i.e. PictBridge).

In general, there are at least two ways for such PTP translator to translate PTP communication traffic:

Acting as a gateway to perform translation, interpret PTP commands and also generate simple PTP protocol elements (i.e. implement OpenSession, CloseSession, etc.) to deal with multiple sessions on one side and single session on the other side (i.e. PTP Gateway). That means that the device should know the semantics of PTP commands, and in particular PTP commands used by the PictBridge protocol and being relayed by the translator. A disadvantage can be that it is difficult to implement a generic gateway, because a device may use vendor commands for which the semantics are not known. In general, a gateway can be vendor specific or alternatively allow just standard PTP commands (for which the semantics are defined).

Acting as a bridge to pass-through a PTP command from one end to another using a common translation procedure that converts the packets of one transport protocol to another transport protocol. An advantage is that a generic bridge can be opaque for a PTP device that maintains vendor features.

Some useful cases of translators, which will be described in more detail later, are as follows:

PTP Camera Adapter—Internal or external PTP/USB to PTP/IP device that network enables an existing USB digital camera. In particular, when implemented externally, the adapter can take the form of a dongle. The camera only runs PTP protocol over USB, while the PTP adapter acting as either a bridge or a gateway runs the communication protocols that make the camera a PTP network camera. One end of the adapter acts as a USB-Initiator and is connected to the camera, and another end is a PTP/IP-Responder and is connected to a PTP/IP Initiator.

PTP Printer Adapter—Internal or external PTP/IP to PTP/USB device that network enables an existing USB PictBridge™ Printer. Again, when implemented externally, the adapter can take the form of a dongle. The printer runs PictBridge™ over USB, while the PTP adapter, running as a gateway, has the communication protocols to make the printer look like a network PictBridge™ printer. In this case, one end of the adapter is a USB-Responder and is connected to the printer, and another end is a PTP/IP-Initiator and is connected for example across a WLAN to a WiFi camera. Such a translator allows a currently available standard PictBridge printer to talk with PTP/IP cameras that will soon appear on the market.

PTP PC Adapter—PTP/IP to PTP/USB Device that network enables an existing PC that works with standard USB PTP cameras. The PC runs a standard PTP/USB Initiator (i.e. Windows XP WIA or MAC OSX ICA), while the adapter acts as a standard PTP Responder every-time it detects a peer PTP/IP Responder, making it look to the PC as it would be directly attached via a USB cable.

PTP Camera Adapter

Figure 7A:
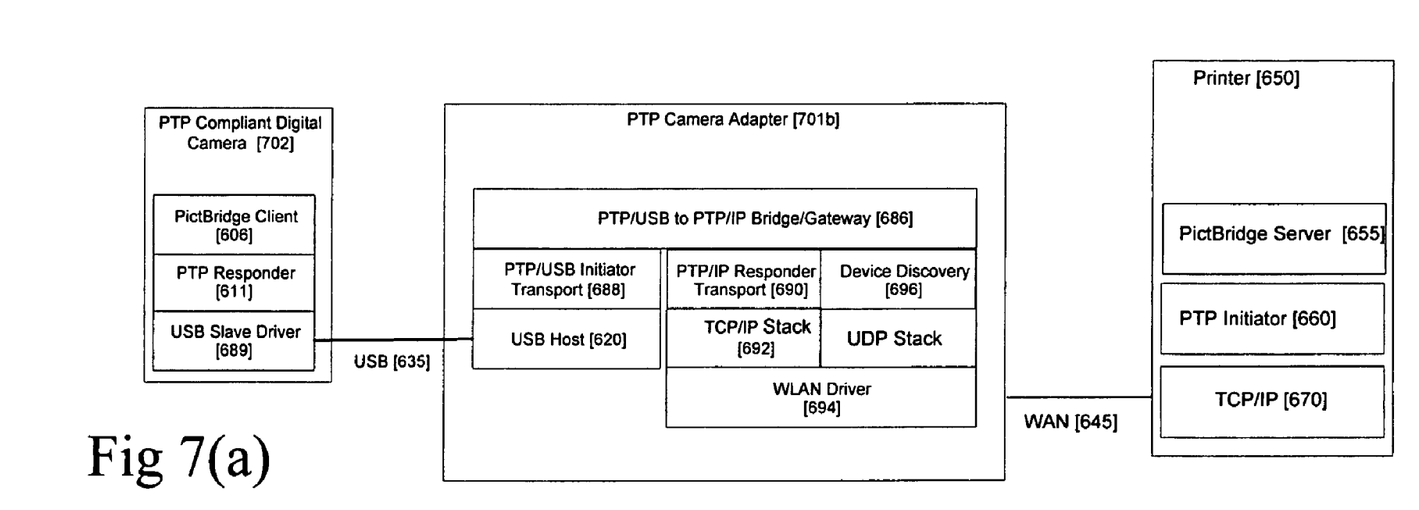

Referring now to FIG. 7(a), a convention PTP compliant digital camera 702 is connected via a USB connection 635 to a PTP Camera Adapter 701b according to a preferred embodiment. In this case, the camera PTP responder 690 communicates across a wireless LAN via a driver 694, although it will be seen that it can be arranged to communicate across any network—wired or wireless—using any required transport.

It should be noted that in a conventional PTP compliant camera, the PTP Responder 611 will in general not allow multiple PTP sessions—because a USB slave 689 was only connectable with one USB host 620 at a time.

However if the features of the PTP Camera Adapter are extended, then the adapter 701b be used in at least two different scenarios:

to allow the camera to implement PictBridge™ client; and/or to allow the camera to implement a PTP generic responder.

Where the camera implements a PictBridge™ client 606, then an adapter with a single PTP session is enough and a PTP Bridge 686 implementation within the adapter will suffice. The protocol for selecting the PTP device with which the camera communicates during this session is as described in relation to FIGS. 2 to 6 and is implemented within a device discovery layer 696 which is responsive to a user actuating a pairing actuator (not shown) on the adapter 702b and the printer 650 within the required time out period and without interference from other pairing devices.

Where the camera implements a PTP generic Responder, then it is natural for this Responder to work with multiple Initiators in the network. In order for the PTP Camera Adapter to support multiple PTP sessions, the adapter supports a feature called "Virtual Sessions". With Virtual Sessions the adapter serializes PTP traffic from multiple remote devices including PTP Initiators 660 to one USB slave 689. Each remote initiator is paired in sequence with the adapter as described with reference to FIGS. 3 to 6, so limiting the connections to the camera 702.

In relation to virtual sessions, a unit of serialization normally is a PTP Transaction. In most cases, the standard PTP commands are stateless—so allowing one PTP Transaction at a time will do for simple scenarios. However, in general there are standard and as well as vendor commands that work in a specific sequence and are not stateless. In that case the adapter would utilizes further semantics of such commands and a more complex serialization of transactions, e.g., so that one Initiator 660 will not break an atomic command sequence of another Initiator. Additionally, some commands involve more actions than just passing-through: e.g. a DeleteObject command involves sending ObjectRemoved event for each Virtual Session than the current one. For this reason, a PTP Gateway 686 implementation is more appropriate for implementing Virtual Sessions and for ensuring an ordered processing of transactions between sessions for devices paired through the adapter.

In one implementation of the adapter, both Bridge and Gateway are implemented. Most of the time, the adapter works in Bridge mode (while only one session is active). If multiple Initiators want to work with the camera, then the adapter switches into PTP Gateway mode, allowing virtual multiple sessions.

PTP Printer Adapter (Dongle)

Figure 7B:
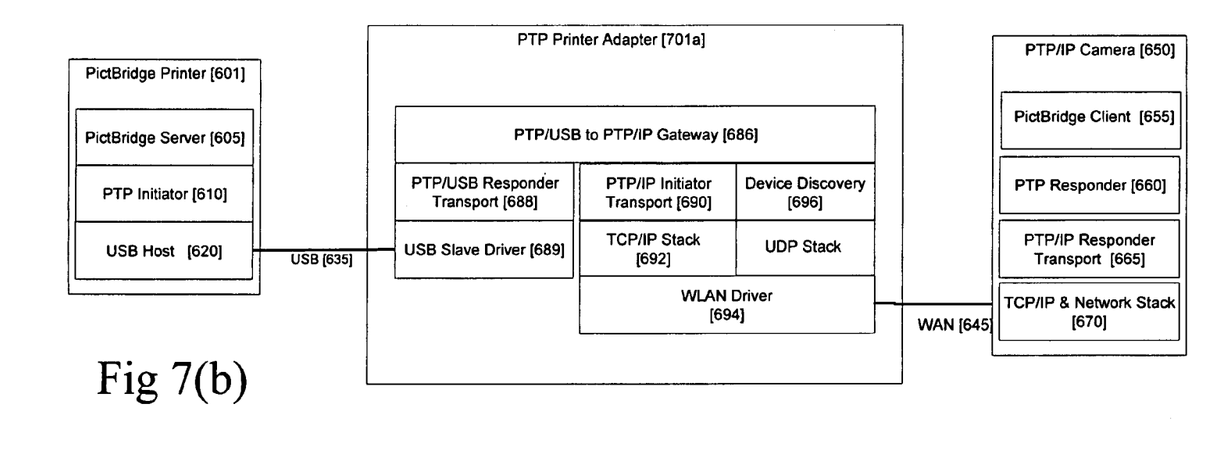

Referring now to the example illustrated at FIG. 7(b), the printer adapter 701a of this embodiment has two interfaces: a WIFI interface 694 and USB Slave interface 689. Its primary function is to transform a standard USB PictBridge™ printer 601 into a WIFI PictBridge™ printer, available on a wireless local area network 645. Such an adapter preferably connects only to PictBridge™ clients (PTP/IP Responders that advertise their application protocol to be PictBridge™, or their intent to print).

It will be seen that the adapter 701a can in practice only be implemented with a gateway layer 686 rather than with more basic bridge functionality. One reason is that the legacy printer side USB transport (unlike PTP/IP) does not carry enough self-descriptive information about the command being transported, so it does not allow the PTP Printer Adapter (or a PTP PC Adapter) to be implemented as a PTP Bridge. Another reason is that a PTP Bridge does not allow a virtual session approach to be implemented safely in all cases.

Figure 8:
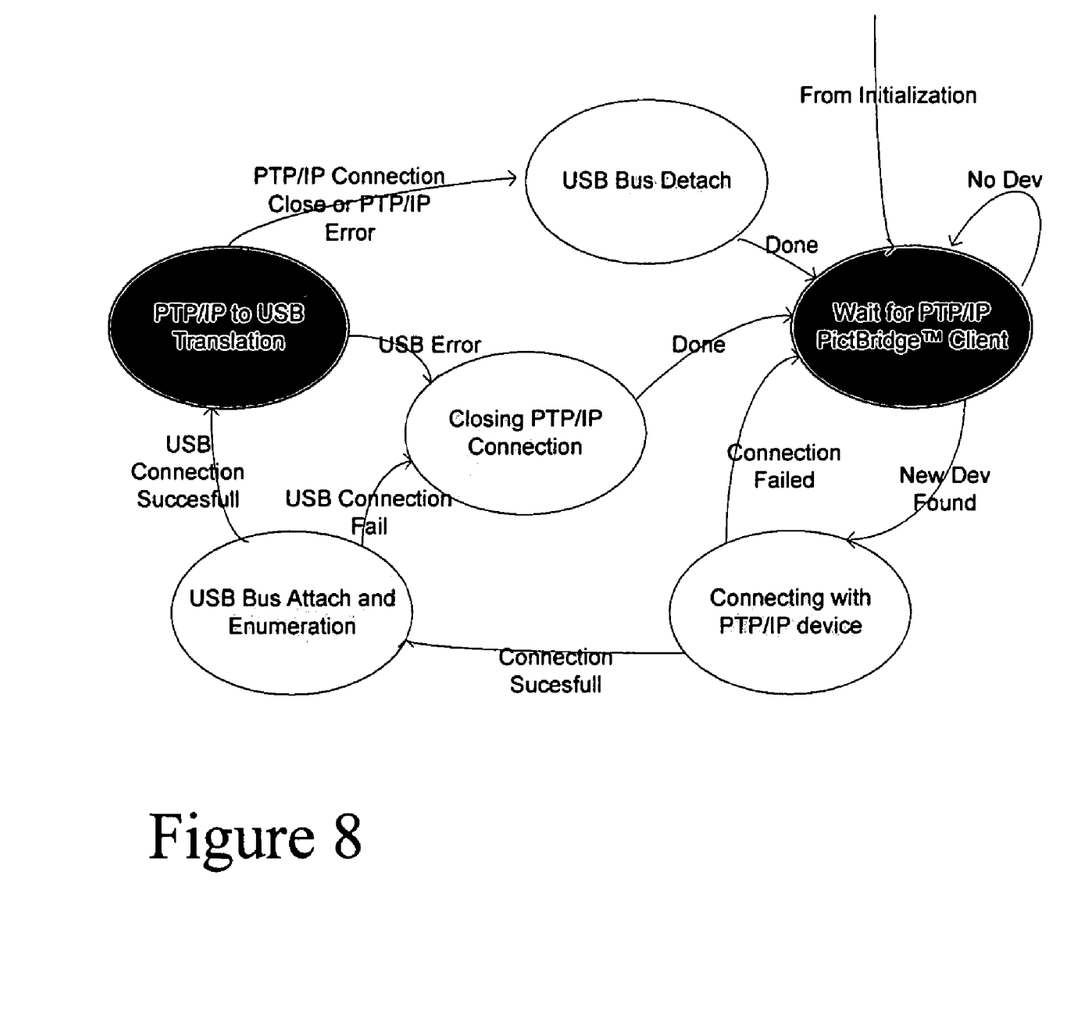
FIG. 8 is a PTP Printer Adapter Normal Function Sequence Diagram.

It will be seen that the PTP Printer Adapter transforms a bus based protocol (USB) into a networking protocol (IP). As shown in FIG. 8, this PTP protocol translation from one transport (PTP/USB) to another transport (PTP/IP) is performed only when a PTP/IP device is detected and a successful PTP/IP connection is established, e.g., as described in relation to FIGS. 3-6 and again performed by the device discovery layer 696. Then, if this is the first session to be established, the USB slave 689 of FIG. 7(b) attaches to the printer's USB bus 620, causing the enumeration and USB connection. The Initiator (printer) starts the communication with the remote PTP device, for example, a PTP/IP camera 650 as it would if the remote device were connected locally.

The USB attach and detach is performed by programmatically connecting/disconnecting a 1.5M pull up resistor (see USB BUS SPECIFICATIONS) used by USB standard for detection of a USB 12 Mbps device connected to the bus.

Since only one remote device 650 connected to the PTP printer adapter 701a prints to the actual printer at a time, the printer adapter deals with multiple paired PTP/IP devices in sequence beginning with the first paired device for which print intent has been detected. Once the printing is done with this device, the dongle looks for more paired PTP/IP devices (with print intent). If more devices are detected, the printer chooses one and initiates the connection to them.

Due to the PTP/USB transport specification limitations (i.e not knowing the next phase of a PTP command), the translation that takes place between PTP/USB and PTP/IP can't be done just at the transport level. The device will need to be a PTP Gateway, in the sense that it will interpret the PTP payload to figure out what command is in progress. In this way, the translator will be able to associate a command with a known data-phase (by maintaining a lookup table with the associations). This device is not generally designed to work with vendor specific commands, and so, for each vendor command to be supported, the translation table would be updated with vendor specific information.

PTP PC Adapter

Figure 7C:
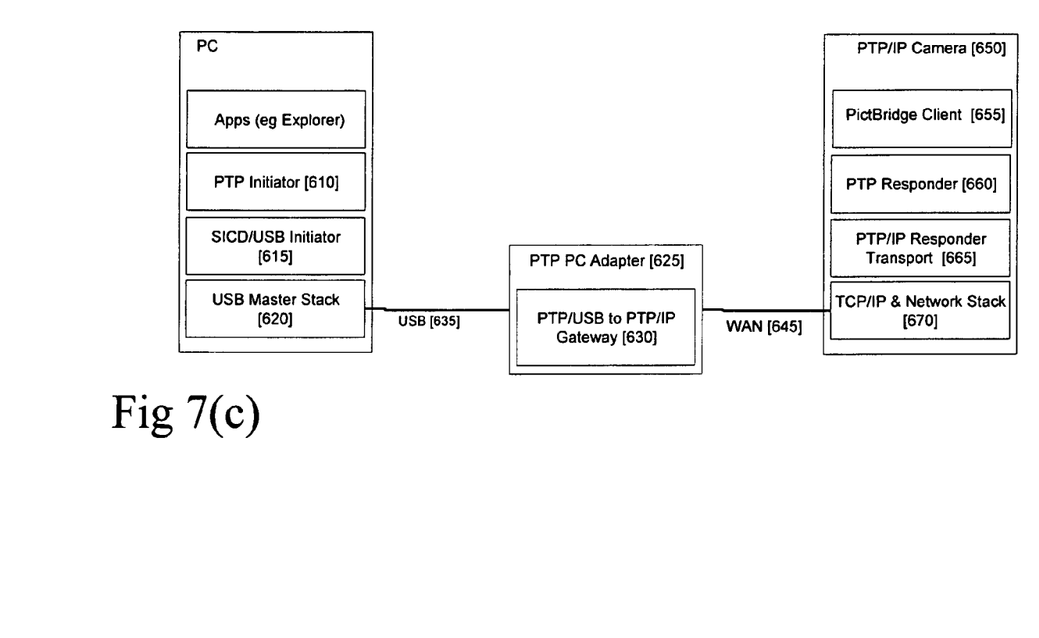

Referring to FIG. 7(c), PC adapter 625 works in a very similar manner as the PTP Printer Adapter of FIG. 7(b). A difference is that it can establish a connection with a PTP generic responder application instead of a PictBridge PTP responder. This device, due to USB limitations, will be either connected with only one PTP/IP Responder, for example, within a PTP/IP camera 650, either at any time or it would establish virtual sessions for each PTP/IP Responder.

The present invention is not limited to the embodiments described above herein, which may be amended or modified without departing from the scope of the present invention as set forth in the appended claims, and structural and functional equivalents thereof.

In methods that may be performed according to preferred embodiments herein and that may have been described above and/or claimed below, the operations have been described in selected typographical sequences. However, the sequences have been selected and so ordered for typographical convenience and are not intended to imply any particular order for performing the operations.

In addition, all references cited above herein, in addition to the background and summary of the invention sections, are hereby incorporated by reference into the detailed description of the preferred embodiments as disclosing alternative embodiments and components.

The invention claimed is:

1. A method for establishing a paired connection between first and second media devices across a network, comprising:
    responsive to user interaction with the first media device, transmitting a first information message across the network including an identifier that includes a request to pair the first media device with the second media device;
    responsive to receipt of a second information message from the second device within a first predetermined time period, retrieving an identifier of the second device from the second information message and transmitting across the network a confirmation message including an identifier of the first device and an identifier of the second device; and
    responsive to receipt of a corresponding confirmation message from the second device within a second predetermined time period, completing a paired connection with the second device, said connection employing a communications protocol which permits the first device to control the second device in providing a media acquisition, filtering or output service, or combinations thereof.

2. A method according to claim 1, wherein one or more of the information and confirmation messages are transmitted via User Datagram Protocol.

3. A method according to claim 1, wherein said first and second time periods are substantially the same.

4. A method according to claim 1, wherein said first media device is responsive to receipt of an information message from a third media device, different from said second media device, upon failing to establish said paired connection with said second device during said first predetermined time period.

5. A method according to claim 1, wherein said first media device is responsive to receipt of a confirmation message from a third media device, different from said second device, upon failing to establish said paired connection with said second media device during said second predetermined time period.

6. A method according to claim 1, further comprising establishing one or more further paired connections with further media devices.

7. A method according to claim 1, wherein each of said information and confirmation messages includes a protocol identifier.

8. A method according to claim 1, further comprising communicating according to the Picture Transfer Protocol (PTP).

9. A method according to claim 1, wherein at least one of the first and second devices comprises a digital camera.

10. A method according to claim 9, wherein at least one of the first and second devices comprises a printer.

11. A method according to claim 1, wherein upon receipt of said first message and actuation of a switch, said second device automatically generating and transmitting said second message.

12. A method according to claim 1, wherein upon receipt of said second message and actuation of a switch, said first device automatically generating and transmitting said confirmation message.

13. A media device for handling media and establishing a paired connection with a second media device across a network, comprising:
   a media device housing containing a media handling component architecture;
   a network interface coupled with the component architecture; and
   a pairing actuator signal-coupled with the network interface such that, upon user interaction with the pairing actuator, transmission of an information message is initiated through said network interface, said information message including an identifier indicating that the user of the device wishes to pair the device with a second media device,
   wherein responsive to receipt of an information message through said network interface from the second media device within a first predetermined time period, the first media device further for retrieving an identifier of the second device from the information message and for transmitting a confirmation message through said network interface including an identifier of the first device and an identifier of the second device; and
   responsive to receipt of a corresponding confirmation message through said network interface from the second media device within a second predetermined time period, the first media device further for completing a paired connection with the second device, said connection employing a communications protocol which permits the first device to control the second device in providing a media acquisition, filtering or output service, or combinations thereof.

14. A device according to claim 11, further comprising a microprocessor or one or more other general purpose computing device components, printer architecture, digital image acquisition device architecture, or an adapter, or combinations thereof.

15. A device according to claim 14, wherein the network interface comprises an Internet Protocol (IP) transport interface.

16. A device according to claim 15, wherein the network interface comprises a Wireless Local Area Network interface, a Bluetooth interface, or an Ethernet interface interface, or combinations thereof.

17. A device according to claim 14, further comprising an adapter that includes a bus interface for communicating with said network interface upon establishment of said paired connection.

18. A device according to claim 17, wherein said bus interface comprises a USB interface.

19. A device according to claim 17, wherein the adapter further comprises a PTP initiator module for communication with a PTP compliant device across said bus interface.

20. A device according to claim 19, further comprising a PTP responder module for communication with one or more PTP/IP compliant devices through said network interface.

21. A device according to claim 20, further for establishing one or more further paired connections with respective devices.

22. A device according to claim 21, further for establishing respective PTP sessions with each device for which a paired connection has been established through said network interface.

23. A device according to claim 22, wherein said device acts as a bridge when a paired connection has been established with only one device.

24. A device according to claim 22, wherein said device acts as a gateway when more than one paired connection has been established.

25. A device according to claim 14, the device comprising a digital camera.

26. A device according to claim 25, wherein the second device comprises a printer.

27. A device according to claim 14, wherein upon receipt of said first message and actuation of a second pairing actuator associated with said second device, said second device automatically generating and transmitting said second message.

28. A device according to claim 14, wherein upon receipt of said second message and actuation of said pairing actuator, said first device automatically generating and transmitting said confirmation message.

29. A computer processor readable storage device having processor readable code embodied thereon, said processor readable code for programming a processor to perform a method for establishing a paired connection between first and second media devices across a network, the method comprising:
   responsive to user interaction with the first media device, transmitting a first information message across the network including an identifier that includes a request to pair the first media device with the second media device;
   responsive to receipt of a second information message from the second device within a first predetermined time period, retrieving an identifier of the second device from the second information message and transmitting across the network a confirmation message including an identifier of the first device and an identifier of the second device; and
   responsive to receipt of a corresponding confirmation message from the second device within a second predetermined time period, completing a paired connection with the second device, said connection employing a communications protocol which permits the first device to control the second device in providing a media acquisition, filtering or output service, or combinations thereof.

30. The computer processor readable storage device of claim 29, wherein one or more of the information and confirmation messages are transmitted via User Datagram Protocol.

31. The computer processor readable storage device of claim 29, wherein said first and second time periods are substantially the same.

32. The computer processor readable storage device of claim 29, wherein said first media device is responsive to receipt of an information message from a third media device, different from said second media device, upon failing to establish said paired connection with said second device during said first predetermined time period.

33. The computer processor readable storage device of claim 29, wherein said first media device is responsive to receipt of a confirmation message from a third media device, different from said second device, upon failing to establish said paired connection with said second media device during said second predetermined time period.

34. The computer processor readable storage device of claim 29, the method further comprising establishing one or more further paired connections with further media devices.

35. The computer processor readable storage device of claim 29, wherein each of said information and confirmation messages includes a protocol identifier.

36. The computer processor readable storage device of claim 29, the method further comprising communicating according to the Picture Transfer Protocol (PTP).

37. The computer processor readable storage device of claim 29, wherein at least one of the first and second devices comprises a digital camera.

38. The computer processor readable storage device of claim 37, wherein at least one of the first and second devices comprises a printer.

39. The computer processor readable storage device of claim 29, wherein upon receipt of said first message and actuation of a second pairing actuator associated with said second device, said second device automatically generating and transmitting said second message.

40. The computer processor readable storage device of claim 29, wherein upon receipt of said second message and actuation of said pairing actuator, said first device automatically generating and transmitting said confirmation message.

* * * * *